United States Patent [19]
Speros et al.

[11] Patent Number: 5,810,029
[45] Date of Patent: Sep. 22, 1998

[54] ANTI-ICING DEVICE FOR A GAS PRESSURE REGULATORS

[75] Inventors: Philip C. Speros, Easton; Brian Fullerton, Kingsville, both of Md.

[73] Assignee: Bennett Regulator Guards, Inc., Baltimore, Md.

[21] Appl. No.: 491,273

[22] Filed: Jun. 16, 1995

[51] Int. Cl.⁶ .................................................. F16K 27/12
[52] U.S. Cl. .......................................... 137/377; 137/505
[58] Field of Search .................................. 137/377, 382, 137/505

[56] References Cited

U.S. PATENT DOCUMENTS

| | | | |
|---|---|---|---|
| 2,421,700 | 6/1947 | Johnson | 137/377 |
| 2,937,658 | 5/1960 | Stewart | 137/505 |
| 2,968,314 | 1/1961 | Whitworth | 137/505 X |
| 3,012,573 | 11/1961 | Peterson | 137/505 |
| 3,747,629 | 7/1973 | Bauman | 137/505 X |
| 3,768,503 | 10/1973 | Billington | 137/377 |
| 4,091,837 | 5/1978 | Edmunds et al. | 137/341 |
| 4,460,013 | 7/1984 | Milo | 137/493.4 |
| 4,462,223 | 7/1984 | Perkins | 62/514 |

Primary Examiner—Stephen M. Hepperle
Attorney, Agent, or Firm—Rankin, Hill, Lewis & Clark

[57] ABSTRACT

An ice preventing device for use with an outside gas pressure regulator that has a pressure vent and a downwardly opening vent tube. The device includes a skirt connected to and surrounding the vent tube. The upper end of the skirt has an opening that communicates with the passage in the vent tube. The skirt also has an enlarged, flared-out lower end with an opening substantially greater than the area of the opening at the upper end. Located within the skirt is a baffle positioned in a generally horizontal plane. The baffle is positioned below the vent tube opening of the pressure regulator to prevent rain or freezing rain from splashing back upwardly into the passage. The sides of the baffle are spaced from the interior walls of the skirt to accommodate gas flow around the baffle,

8 Claims, 4 Drawing Sheets

ANTI-ICING DEVICE FOR A GAS PRESSURE REGULATORS

BACKGROUND OF THE INVENTION

This invention relates to natural gas distribution and especially to problems associated with the pressure regulator valve used to reduce gas pressure from the relatively high level used in a distribution system to the relatively low pressure level used in a customer's building or residence. More particularly, the invention relates to a means for preventing failure of the pressure regulator due to ice formation.

Gas pressure regulators used in natural gas distribution systems at customer connection points must typically reduce pressure from around 80 psi (used by the gas utility in its distribution system) to around 0.4 psi (used in typical consumer gas lines). The regulator valve most commonly used, for example, in residential connections, is a mechanical valve located outside the building or residence to be served. It functions as a pressure transducer, controller, and actuator.

The device, however, is relatively simple in design. The pressure transmitted to the downstream side (i.e. customer lines) is adjusted by opening or closing a poppet valve which throttles the flow of gas from one side to the other. As the valve is adjusted, the controlled pressure falls or rises. The poppet valve thus serves as the actuator in a feedback control system. The head of the poppet valve is mounted on a plunger which moves between open and closed positions.

The reference input is the force applied by a compression spring, usually a helical spring. The spring is operatively connected to the opposite end of the plunger and biases the plunger to the valve open position. The spring force is countered by the fluid pressure acting on the input side of the valve and tending to close it.

A diaphragm housing is located on the downstream or low pressure side of the valve and has a flexible diaphragm therein that divides the interior space into a low pressure chamber and an atmospheric pressure chamber. The low pressure chamber communicates through a small opening with the low pressure gas passage on the output side of the valve and the atmospheric pressure chamber is vented to atmosphere through a small opening.

The plunger is connected to the diaphragm so that when the desired gas pressure on the output side is reached, sufficient pressure is applied to the diaphragm, and thus to the plunger, to move the valve head toward its closed position. This rather simple automatic pressure control system performs in a very reliable manner.

One problem encountered, however, with this type of pressure regulator, is that of icing. The regulator is generally mounted outside the building or structure where it is exposed to prevailing weather conditions. For this reason, the vent in the diaphragm housing is usually protected by a section of tubing (vent tube) that faces downwardly and has a metal screen over the outlet end. The vent tube's orientation prevents snow and rain from entering and the screen protects against insects, etc. that might otherwise enter the passage.

This arrangement, however, does not prevent the problem associated with freezing rain, sleet, etc. The icing problem may occur in two ways: First of all, an icicle may form on the lower end of the vent tube and actually cause complete closure. Secondly, rain or freezing rain may splash up to the end of the pipe and freeze on the screen causing eventual closure.

When either or both of these circumstances occur, the atmospheric pressure chamber of the diaphragm housing is not vented and pressure may build up without regulation. In some instances, gas may leak around the diaphragm to the atmospheric pressure chamber and have no means of escape. In this case, the valve will not close and as a result, pressure on the outlet or downstream side will build up to dangerous levels. This can cause catastrophic results such as explosion and/or fire.

The device of the present invention, however, reduces the difficulties outlined above and affords other features and advantages heretofore not obtainable.

SUMMARY OF THE INVENTION

In accordance with the present invention, there is provided an ice preventing device for use in combination with an outside gas pressure regulator connected between a high pressure gas source and a low pressure gas line such as at a customer connection point. The regulator with which the ice preventing device is used includes a valve for controlling gas flow between the high pressure source and the low pressure line, and a flexible diaphragm. A resilient device (e.g. a spring) biases the valve to an open position. The diaphragm is operatively connected to the valve and defines an atmospheric pressure chamber on one side and a low pressure gas chamber on the other side. The low pressure gas chamber communicates with the low pressure gas line and the atmospheric pressure chamber is vented to atmosphere. The vent passage has its exit side located in a vent tube with an outer end that faces vertically downward so that rain and snow cannot enter the passage.

The ice preventing device of the invention includes a skirt receiver means adapted to be operatively connected to the vent tube, and a skirt having an upper end with an opening adapted to communicate with the passage in the vent tube and an enlarged or flared out lower end with an opening having an area of substantially greater than the area of the opening at the upper end. The skirt is operatively connected to the receiver means. Located within the skirt, is a baffle positioned in a generally horizontal plane and supported therein. The baffle is positioned below the vent tube opening to prevent rain or freezing rain from splashing back upwardly into the passage. The sides of the baffle are spaced from the interior walls to provide for gas flow around the baffle adjacent the interior walls of the skirt. The device, thus described, functions to prevent icicles from forming in such a manner as to block the outlet of the skirt and also prevents ice formation from splash-back of rain or freezing rain which could otherwise seal the vent passage opening.

Figure 1:
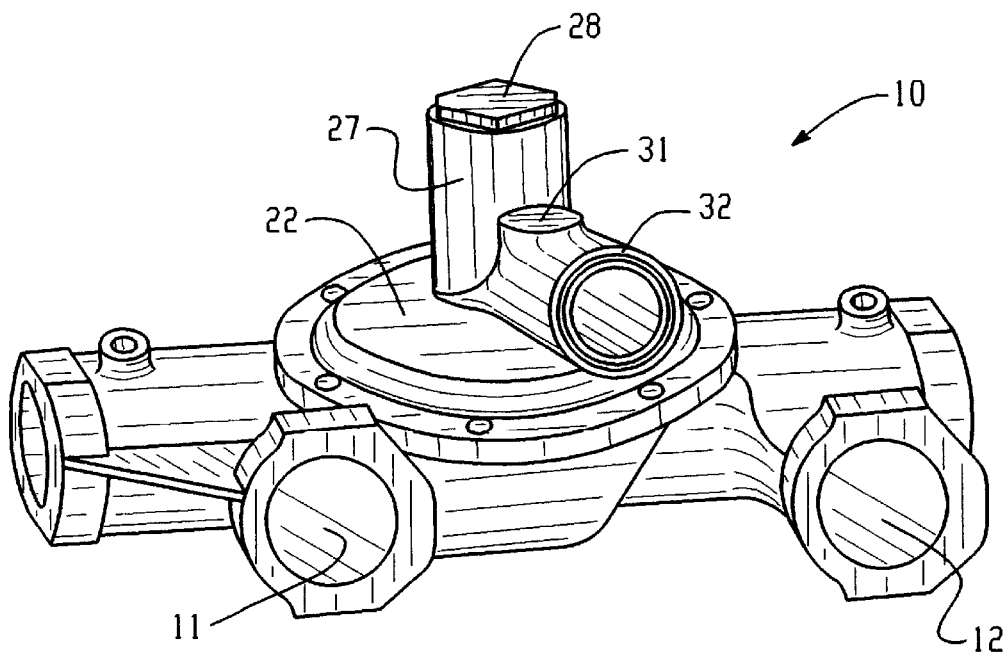
FIG. 1 is a perspective view of a typical gas pressure regulator valve assembly of the type with which the device of the present invention may be used.
Figure 2:
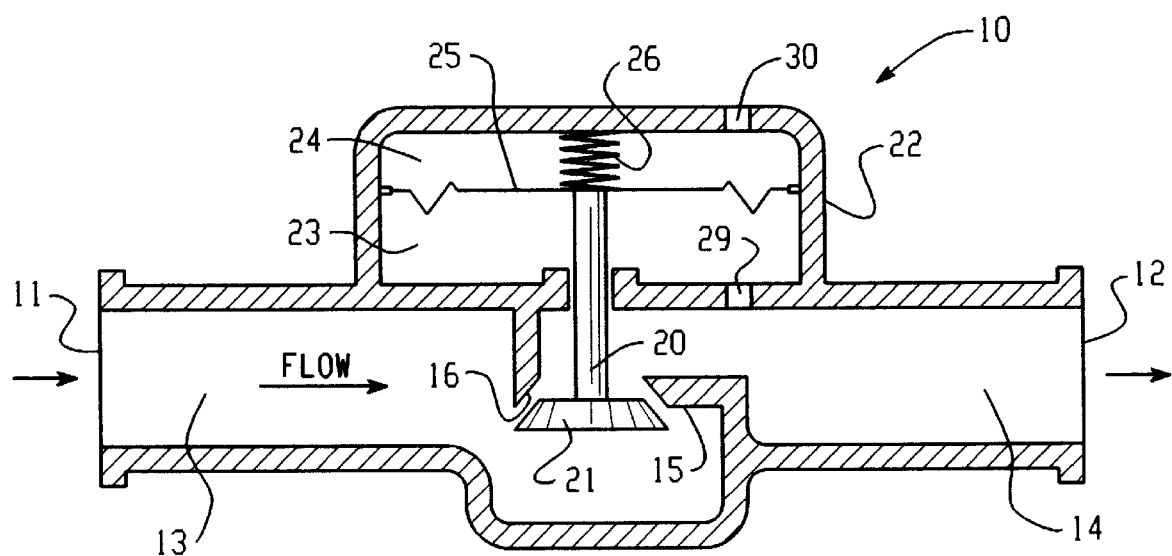
FIG. 2 is a diagrammatic view illustrating the operation of the gas regulator valve of FIG. 1.
Figure 3:
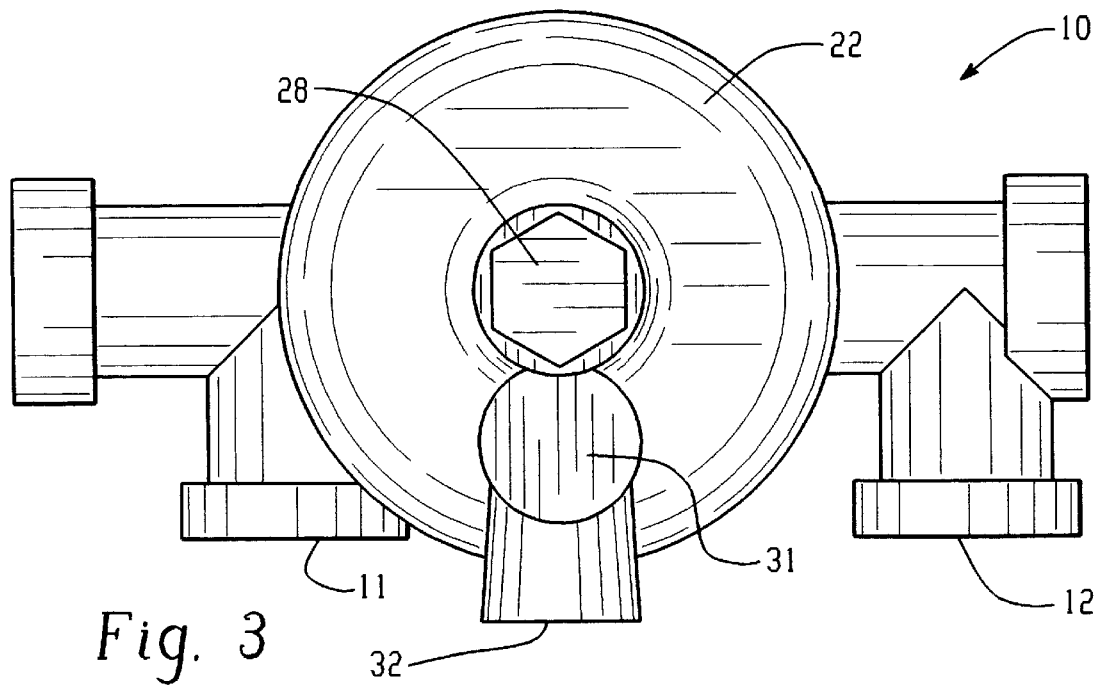
FIG. 3 is a front elevation of a gas pressure regulator valve of FIGS. 1 and 2 shown in its proper vertical orientation.
Figure 4:
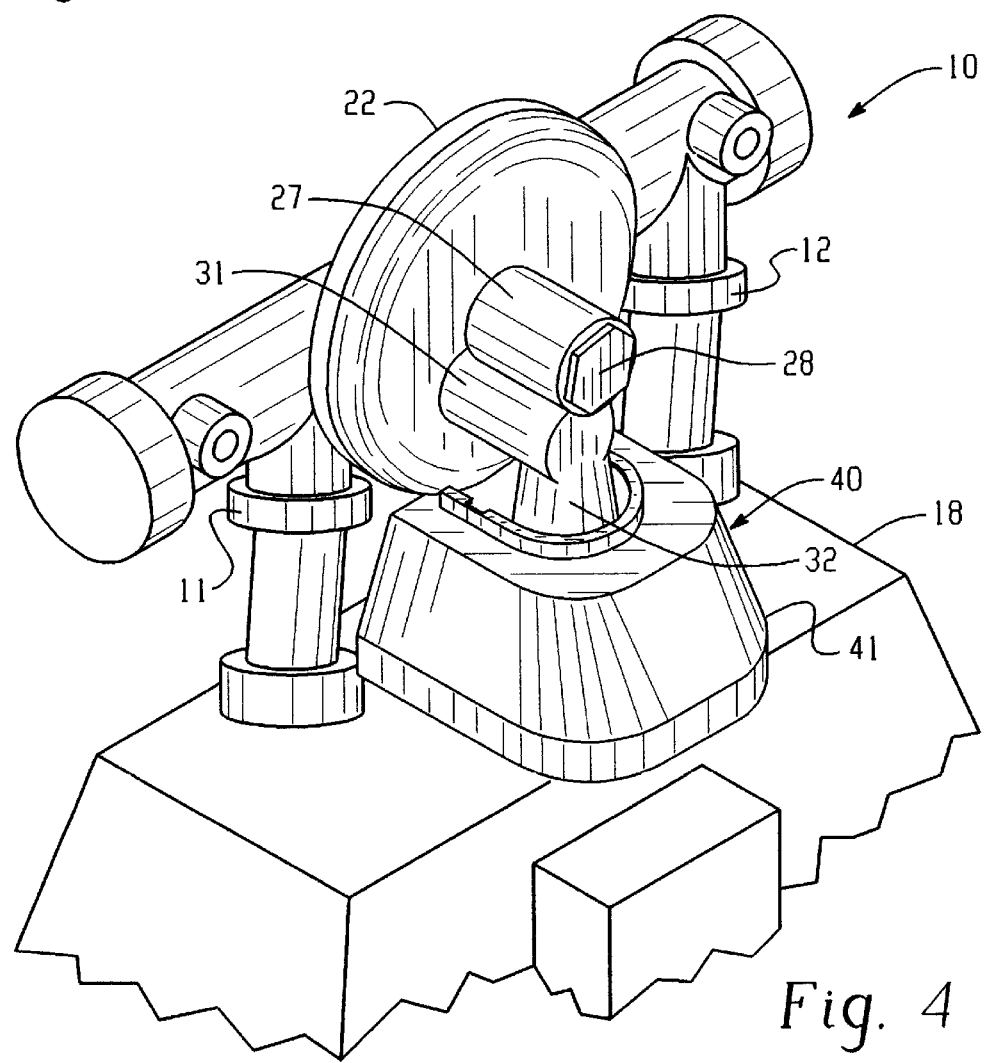
FIG. 4 is a perspective view showing the gas regulator valve of FIGS. 1, 2, and 3 with an ice preventing skirt assembly connected thereto in accordance with the invention.
Figure 5:
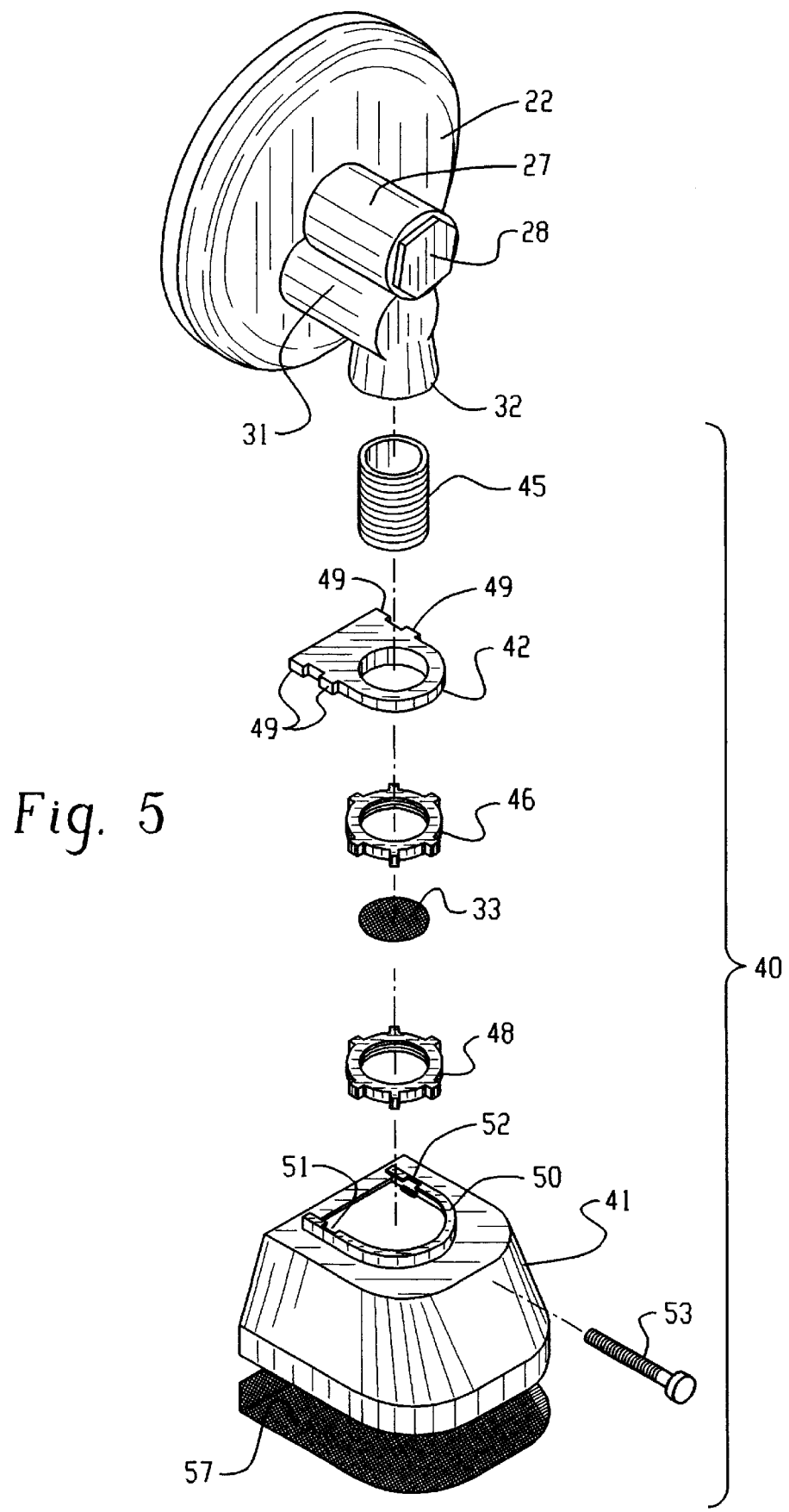
FIG. 5 is an exploded perspective view illustrating the connection of the protective skirt to the regulator valve.

Referring more particularly to the drawings and initially to FIGS. 1, 2, and 3, there is shown a pressure regulator valve typical of the type used by natural gas utilities in a gas distribution system. The purpose of the regulator valve is to reduce the pressure from the distribution system which is around 80 psi to a suitable pressure for use in the gas lines used in the customers facility which may be a commercial or industrial building or a private residence.

Normally, the pressure regulator valve is located outside and in association with the gas meter. The regulator valve has an inlet fitting 11 for connection to the high pressure gas distribution line and a low pressure fitting 12 for connection to the customer service line. The fittings 11 and 12 communicate with a high pressure passage and a low pressure passage 13 and 14 respectively. The passages 13 and 14 are separated by a partition 15 that defines a circular valve port 16. Extending through the valve port 16 is a plunger 20 with a valve head 21 on one end adapted to seat against the portions of the partition 15 that define the valve port 16.

A diaphragm housing 22 is formed on the valve body and defines therein a low pressure gas chamber 23 and an atmospheric gas chamber 24 separated by a flexible diaphragm 25. A helical spring 26 located in a cylindrical spring housing 27 extends into the atmospheric pressure chamber and engages the opposite end of the plunger 20 which in turn is connected to the diaphragm 25. The spring housing has a plug 28 threaded therein to permit replacement of the spring as necessary. The low pressure gas chamber 23 communicates with the low pressure passage 14 through a small port 29 and the atmospheric pressure chamber is vented to atmosphere through a small vent opening 30. The vent opening extends into a vent tube 31 with an outer end portion 32 that extends downwardly to prevent snow and rain from collecting therein. Normally, the vent tube has a screen 33 mounted over its opening to prevent intrusion by insects, etc.

In accordance with the invention, a skirt assembly 40 is connected to the vent tube 31 to reduce the possibility of closure of the vent opening by ice formation. Ice formation without the skirt assembly can occur either through the formation of a large icicle on the lower end 32 of the vent tube 31 or by splash-back of rain or freezing rain upwardly to the lower end of the vent tube which, in certain temperature conditions, can result in ice formation over the screen 33.

The skirt 4 assembly deals with these problems in two ways. First of all, it prevents the formation of an icicle over the end 32 of the vent tube by enclosing the space around the vent tube and providing a substantially expanded passage. Secondly, because the skirt assembly is flared out substantially from the center line of the exit passage, rain or freezing rain is deflected away from an area where it could splash upwardly back into the vent tube.

The skirt assembly 40 includes a main skirt body 41 and a receiver 42. A nipple 45 is threaded into the end 32 of the vent tube 41 and the receiver 42 is secured in position against the end of the vent tube by a nut 46. The screen 33 is secured on the outer end of the nipple 45 by a threaded retainer cap 48. The receiver 42 is provided with outwardly extending tabs 49 which cooperate with a retainer fitting 50 located on top of the skirt body 41. The retainer fitting has a pair of oppositely located slots 51 and 52 which receive the tabs 49 so that the skirt body 41 may be pushed laterally over the receiver 42 into the desired position. The skirt body 41 is then secured to the receiver fitting with a screw 53.

Figure 6:
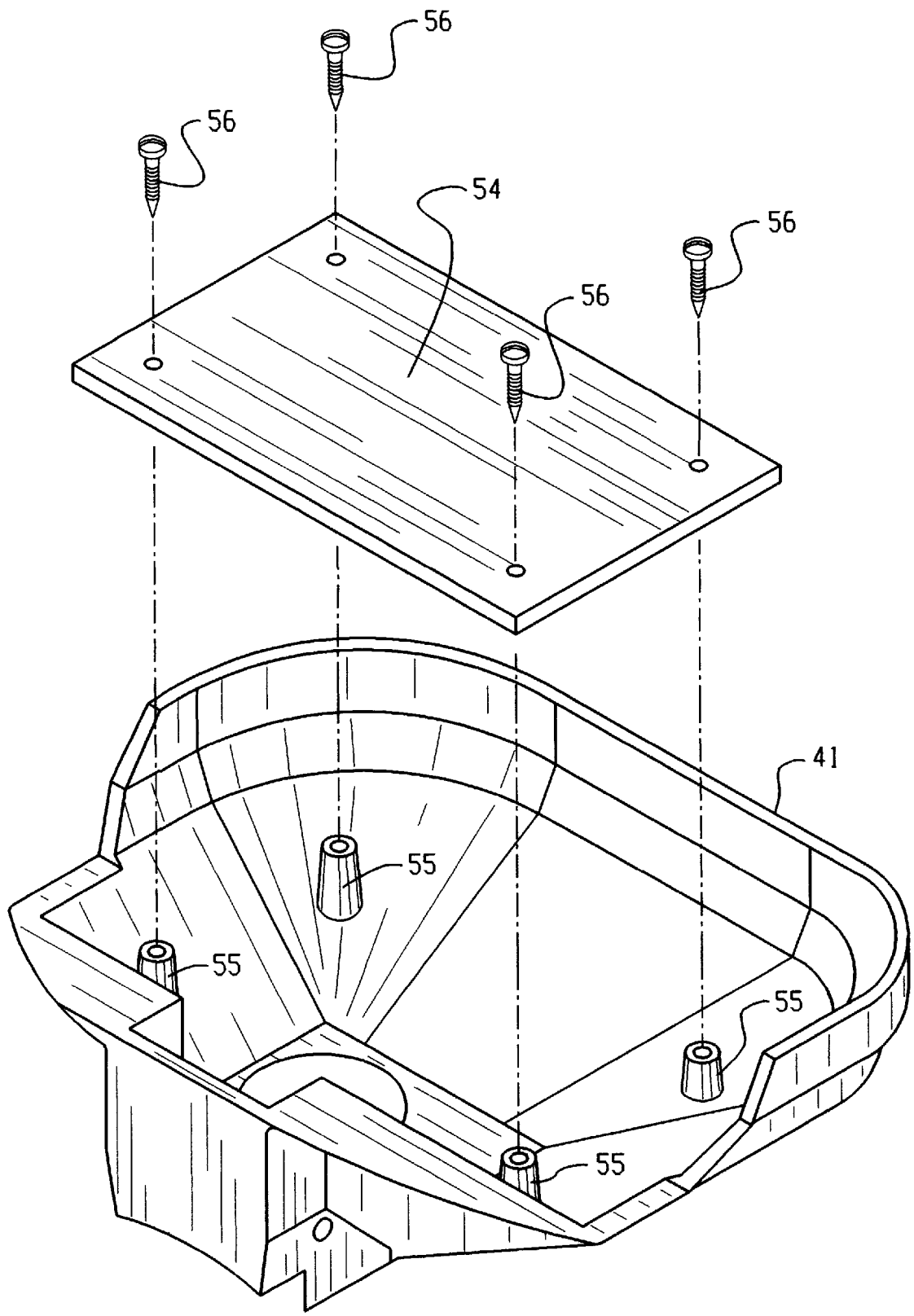
FIG. 6 is an exploded perspective view showing the bottom of the protective skirt and the manner in which the baffle and screen are mounted therein.

FIG. 6 illustrates the interior of the skirt body 41 wherein a baffle plate 54 is positioned to further assist in the prevention of ice formation. The baffle plate is secured to four downwardly extending posts 55 by means of screws 56 so as to position the baffle plate in a manner that blocks any splash-back of rain or freezing rain upwardly toward the vent tube opening. The edges of the baffle plate, however, are sufficiently spaced from the interior walls of the skirt that substantial space is provided for the venting of gas and or air through the skirt. Normally, a screen 57 is mounted at the lower end of the skirt to prevent intrusion by insects, etc.

The skirt body 41, retainer 42, and baffle 54 should be formed of a moldable material that satisfies the requirements for this particular application. The material should be chemically resistant to natural gas, methanol, and ethanol and should be ultraviolet resistant to prevent degradation by sunlight. Also, the material should be flame resistant to prevent fires being initiated by ignition of the skirt.

It is also important that the material have anti-static characteristics to prevent sparks during installation. It is particularly important that the material be conductive and have, for example, a resistivity of no greater than 1000 ohms. One material that is particularly suitable is identified by the trade designation ELECTRAFIL, an acrylonitrile-budadiene-styrene using 3% fine stainless steel fibers as a filler. With this material, static build-up is prevented by conducting any accumulated charge to the metal vent pipe.

Also, the mounting screw 53 is preferably formed of stainless steel which cuts the paint and aluminum body of the regulator, thus creating a contiguous body of stainless steel from the skirt to the regulator housing.

While the invention has been shown and described with respect to a specific embodiment thereof, this is intended for the purpose of illustration rather than limitation and other variations and modifications of the specific device herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A skirt assembly for reducing ice formation at an outlet vent tube from the atmospheric pressure chamber of a diaphragm-type gas pressure regulator, comprising:

a skirt receiver adapted to be operatively connected to said vent tube;

a skirt member defining an interior space and having an upper end opening connecting said vent tube to said interior space and an outwardly flared lower end with an area substantially greater than the area of said upper end opening, said skirt member being operatively connected to said skirt receiver means; and baffle means located in said interior space to underlie said upper end opening and being spaced from the interior walls of said skirt to permit gas flow therearound;

whereby ice formation tending to block said vent tube is inhibited.

2. A skirt assembly as defined in claim 1 wherein said skirt member is formed of a molded plastic material.

3. A skirt assembly as defined in claim 2 wherein said molded material is an electrically conductive plastic.

4. A skirt assembly as defined in claim 1, further including a screen element covering said lower end opening.

5. In combination, an outside gas pressure regulator connected between a high pressure gas source and a low pressure gas line, and a skirt assembly for reducing ice formation; said regulator comprising;

valve means for controlling gas flow between said high pressure source and said low pressure line, a diaphragm housing, a diaphragm located in said housing operatively associated with said valve means and defining with said housing an atmospheric pressure chamber on one side thereof and a low pressure gas chamber on the other side thereof, said low pressure chamber communicating with said low pressure gas line and said atmospheric chamber having an outlet vent means defining a vent passage; said skirt assembly comprising;

skirt receiver means adapted to be operatively connected to said vent means;

a skirt member defining an interior space, an upper end with an opening adapted to communicate with said vent passage, and an outwardly flared lower end with an opening having an area substantially greater than the area of said upper end opening, said skirt member being operatively connected to said skirt receiver means; and baffle means located in said interior space to underlie said vent passage and being spaced from the interior walls of said skirt to permit gas flow therearound;

whereby ice formation tending to block said vent passage is inhibited.

6. A combination as defined in claim 5 wherein said skirt member is formed of a molded plastic material.

7. A combination as defined in claim 6 wherein said molded material is an electrically conductive plastic.

8. A combination as defined in claim 5 further including a screen element covering said lower end opening.

* * * * *

UNITED STATES PATENT AND TRADEMARK OFFICE
CERTIFICATE OF CORRECTION

PATENT NO : 5,810,029
DATED : September 22, 1998
INVENTOR(S) : Speros et al.

It is certified that error appears in the above-identified patent and that said Letters Patent is hereby corrected as shown below:

On the title page: Item [54] and Column 1, line 2,

In the title of the invention after "FOR" delete "A". The title of the invention should read --ANTI-ICING DEVICE FOR GAS PRESSURE REGULATORS--.

Item [75]

Please correct the inventorship to include Greg Bennett as a coinventor.

Signed and Sealed this

Fifth Day of January, 1999

Attest:

Attesting Officer

*Acting Commissioner of Patents and Trademarks*

(12) REEXAMINATION CERTIFICATE (4800th)

United States Patent
Bennett et al.

(10) Number: US 5,810,029 C1
(45) Certificate Issued: Jun. 24, 2003

(54) ANTI-ICING DEVICE FOR GAS PRESSURE REGULATORS

(75) Inventors: Greg Bennett, Stewartstown, PA (US); Phillip C. Speros, Houston, TX (US); Brian Fullerton, Kingsville, MD (US)

(73) Assignee: Bennett Regulator Guards, Inc., Baltimore, MD (US)

Reexamination Request:
No. 90/006,314, Jun. 24, 2002

Reexamination Certificate for:
Patent No.: 5,810,029
Issued: Sep. 22, 1998
Appl. No.: 08/491,273
Filed: Jun. 16, 1995

Certificate of Correction issued Jan. 5, 1999.

(51) Int. Cl.[7] .............................................. F16K 27/12
(52) U.S. Cl. ........................................ 137/377; 137/505
(58) Field of Search ................................. 137/377, 382, 137/505

(56) References Cited

U.S. PATENT DOCUMENTS

| | | | | |
|---|---|---|---|---|
| 2,421,700 A | * | 6/1947 | Johnson | 137/377 |
| 2,937,658 A | * | 5/1960 | Stewart | 137/505 |
| 2,968,314 A | * | 1/1961 | Whitworth | 137/505 X |
| 3,012,573 A | * | 12/1961 | Peterson | 137/505 |
| 3,747,629 A | * | 7/1973 | Bauman | 137/505 X |
| 3,768,503 A | * | 10/1973 | Billington | 137/377 |
| 4,091,837 A | * | 5/1978 | Edmunds et al. | 137/341 |
| 4,460,013 A | * | 7/1984 | Milo | 137/493.4 |
| 4,462,223 A | * | 7/1984 | Perkins | 62/50.7 |

OTHER PUBLICATIONS

Canadian Meter Company, Ltd. bulletin 172.2, Reliance Regulator Vent Caps, undated.

National Meter catalog page No. 42, Weather and Bug Proof Breather Vents, undated.

Canadian Meter Company, Inc. press release, Apr. 1992, Milton, Canada.

* cited by examiner

*Primary Examiner*—John Rivell

(57) ABSTRACT

An ice preventing device for use with an outside gas pressure regulator that has a pressure vent and a downwardly opening vent tube. The device includes a skirt connected to and surrounding the vent tube. The upper end of the skirt has an opening that communicates with the passage in the vent tube. The skirt also has an enlarged, flared-out lower end with an opening substantially greater than the area of the opening at the upper end. Located within the skirt is a baffle positioned in a generally horizontal plane. The baffle is positioned below the vent tube opening of the pressure regulator to prevent rain or freezing rain from splashing back upwardly into the passage. The sides of the baffle are spaced from the interior walls of the skirt to accommodate gas flow around the baffle.

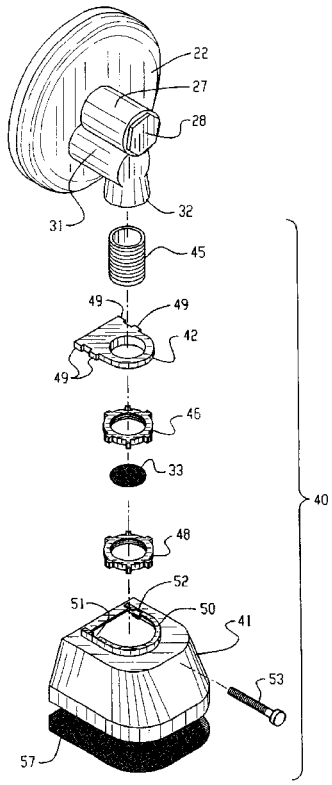

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *